Jan. 15, 1935.                S. SOSKIN                1,988,221
                          METABOLISM MACHINE
                        Filed April 27, 1931        2 Sheets-Sheet 1
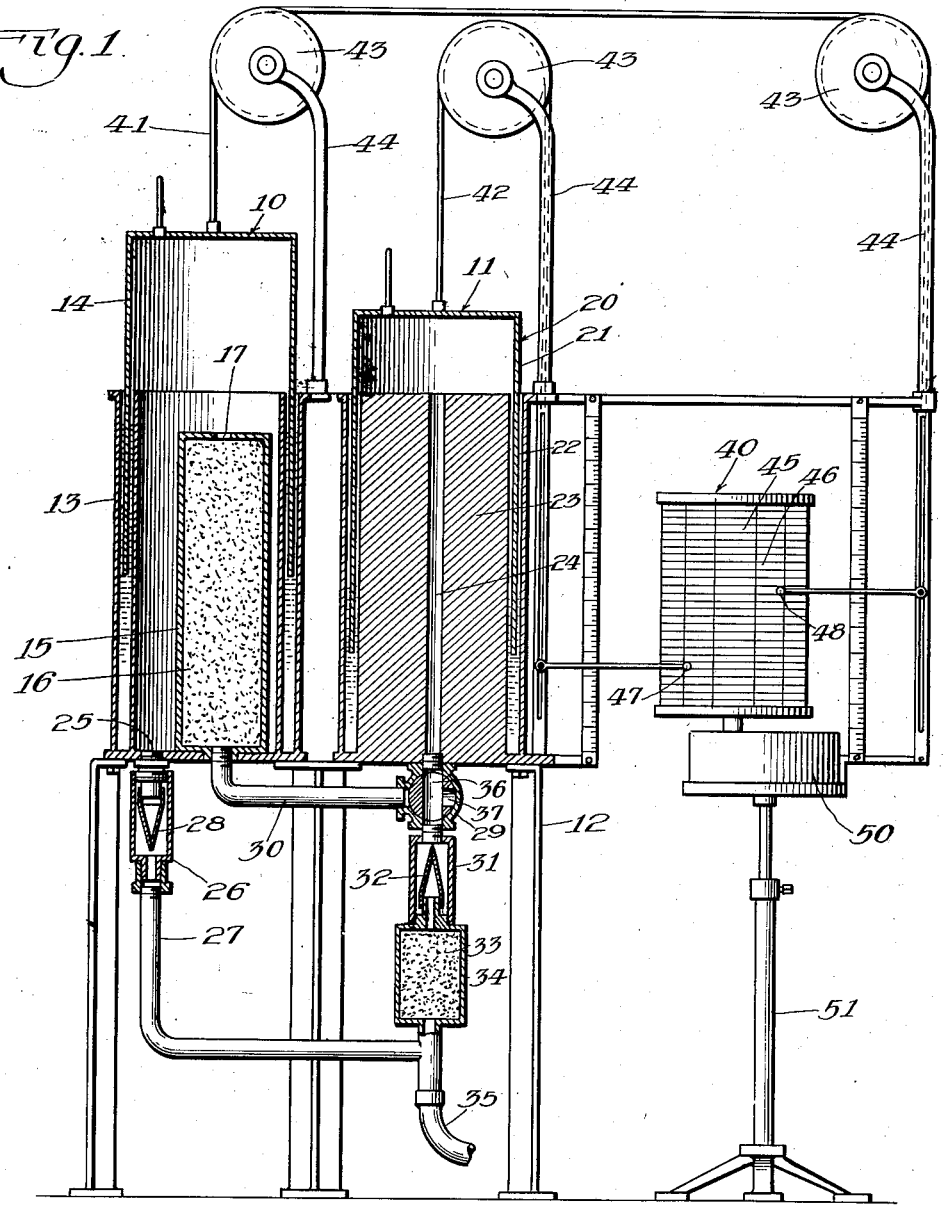
Inventor:
Samuel Soskin,
By Dyrenforth, Lee, Chritton & Wiles
      Attys.

Jan. 15, 1935.　　　　S. SOSKIN　　　　1,988,221
METABOLISM MACHINE
Filed April 27, 1931　　2 Sheets-Sheet 2
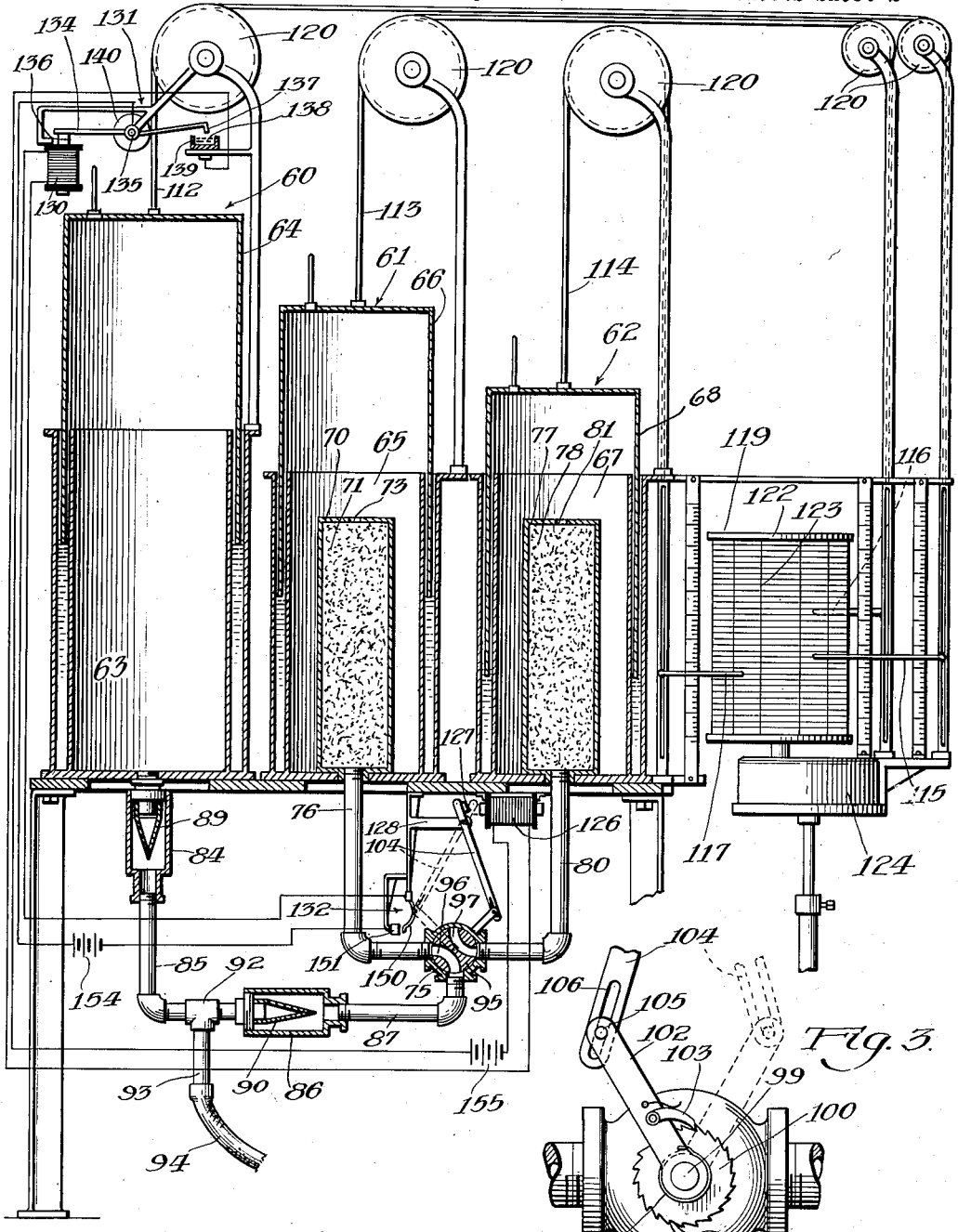
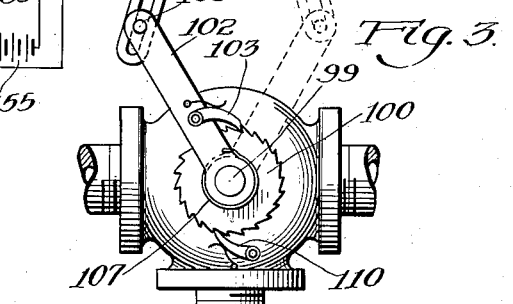
Inventor:
Samuel Soskin, Patented Jan. 15, 1935

1,988,221

UNITED STATES PATENT OFFICE 1,988,221

METABOLISM MACHINE

Samuel Soskin, Chicago, Ill., assignor to Michael Reese Hospital of Chicago, a corporation of Illinois Application April 27, 1931, Serial No. 533,276

12 Claims. (Cl. 128—191)

This invention relates to apparatus for measuring the respiratory exchange of human beings, or animals, and has as its primary object the provision of improved apparatus of the kind described from which data may be obtained that will enable one to determine, with relatively little work, the consumption of oxygen by a subject during a given period and also the amount of carbon-dioxide produced by the subject during the same period.

The metabolism machines now generally employed in hospitals, laboratories, or the like, are particularly adapted to measure the amount of oxygen consumed by a subject and the rate at which it is consumed, but these machines do not lend themselves readily to the measurement of the carbon-dioxide produced by the subject nor to the rate at which the carbon-dioxide is produced. Because of the difficulties involved, the measurement of this carbon-dioxide is usually carried out only in scientific laboratories or in unusually well equipped hospitals.

The apparatus now employed to measure the carbon-dioxide factor depends on one or more of the following principles: The expired air is collected in a spirometer or gas-tight bag and a chemical analysis is made of the gas mixture for the percentages of oxygen and carbon-dioxide contained therein; a weighing bottle is employed in the expiratory part of the metabolism machine, which bottle contains a chemical substance for the absorption of carbon-dioxide, the amount of carbon-dioxide produced being determined by the difference in weight of the bottle before and after the test; a chemical solution is employed in the expiratory part of the metabolism machine for absorbing the carbon-dioxide and after the actual test is over other chemicals are added to the chemical solution so that gas is released, which gas is collected in the spirometer where its volume can be measured; delicate, expensive and synchronized gas-meters are provided to measure the flow of gases into and out of the spirometers. All of these methods require the attendance of highly trained technicians and are subject to error because of the inherent difficulty of an accurate gas analysis; the liability to error in estimating minute differences in weight; the difficulty in standardizing the conditions such as composition of chemicals and change in temperature during the release of absorbed carbon-dioxide from a chemical solution, and the delicate and complicated nature of the apparatus.

In the drawings, two metabolism machines embodying the invention are shown, which machines measure the carbon-dioxide production as well as the oxygen consumption. These machines are not subject to the above criticisms and are substantially as simple in construction and operation as the simple metabolism machines now in use. Both of the improved machines depend on the measurement of the carbon-dioxide by the difference in volume of the expired air before and after the carbon-dioxide is removed from it. This lessens the chances for errors of the type which are usually incurred in gas analyses, weighing or chemical release of carbon-dioxide, and the apparatus is much simpler and less expensive than any involving the use of gas-meters.

Other objects and advantages will become apparent as the following detailed description progresses, reference being had to the accompanying drawings, wherein:

Figure 1 is a vertical central section taken through a metabolism machine which embodies the machine;

Fig. 2 is a vertical central section taken through a metabolism machine which embodies another form of the invention, and Fig. 3 is a fragmentary elevation of a valve which forms part of the metabolism machine shown in Fig. 2, but is on the reverse side of the valve shown in Fig. 2.

Referring for the present to Fig. 1 of the drawings wherein a preferred embodiment of the invention is illustrated, the reference characters 10 and 11 designate, generally, two spirometers which are mounted upon a suitable framework 12.

The spirometer 10 comprises a double walled tank 13 of conventional construction and a bell 14 which has a cylindrical wall adapted to slide between the walls of the tank 13. Disposed within the tank 13 is a housing 15 containing a chemical which absorbs carbon dioxide and moisture. A mixture of calcium hydroxide and sodium hydroxide in granular form may be employed for this purpose. The housing 15 provides a chamber 16 for the chemical, and this chamber communicates with the tank 13 and the bell 14 through an aperture 17 in the housing 15.

The spirometer 11 comprises a bell 20 having a cylindrical wall 21 which rides in a deep annular slot 22 formed in a member 23 which serves as a closure member for the lower end of the bell 20. The member 23 is provided with a central bore or hole 24 which communicates with the interior of the bell 20.

Screw-threaded into the bottom wall of the tank 13 is a pipe 25 which projects into a valve housing 26. A tube 27 is connected to the valve housing 26 in such manner that oxygen may flow from the tank 13 through the pipe 25 and the valve housing 26 into the tube 27, the flow of oxygen being controlled by a check valve 28 of well known construction. The valve 28 is assembled with the pipe 25 and the tube 27 in such manner that it prevents a flow of fluid from the tube 27 through the valve housing 26 into the tank 13.

The chamber 16 communicates with a three-way valve 29 through a pipe 30, the valve 29 being preferably positioned beneath the spirometer 11. The valve 29 also communicates with the bore 24 and a valve housing 31 in which a valve 32 is mounted, the valve 32 being preferably of the same construction as the check valve 28. The valve 32 controls the flow of fluid from a chamber 33 to the valve 29, the construction of the valve 32 being such that it permits fluid to flow from the chamber 33 to the valve 29 and prevents a flow of fluid in the reverse direction. The chamber 33 is formed by a housing 34 and is filled with a chemical which absorbs moisture. Thus calcium chloride may be employed for this purpose.

The tube 27 is connected with the chamber 33 in such manner that fluid which flows from the spirometer 10 through the check valve 28, the pipe 27 to the valve 29 must also pass through the chamber 33. A flexible tube 35 communicates with the chamber 33 at substantially the same point the tube 27 communicates therewith. The outer end (not shown) of the tube 35 is provided with a mouth-piece or mask (not shown) to which the subject is attached and in which the subject breathes.

The valve 29 is provided with valve passages 36 and 37, the construction being such that the valve may be adjusted as illustrated in Fig. 1 to have the bore 24 communicate directly with the valve housing 31 and to disconnect the pipe 30 from the valve housing 31 and the bore 24. The valve 29 may also be adjusted to have the pipe 30 communicate with the bore 24 through the valve passages 36 and 37, the valve 29 being then adjusted so that the bore 24 does not communicate with the valve housing 31.

The bells 14 and 20 are preferably operatively connected to a recording device 40 by cables 41 and 42, respectively, which are trained over sheaves 43, the sheaves 43 being journaled in bearing brackets 44.

The recording device 40 may be of any suitable construction, and preferably comprises a drum 45 carrying a chart 46 upon which data or graphs are inscribed by a stylus 47 and a stylus 48. The stylus 47 is operatively connected to the cable 42 while the stylus 48 is operatively connected to the cable 41, the construction being such that each stylus will be lowered or raised as the corresponding bell is raised or lowered. The drum 45 is preferably driven by suitable clock mechanism (not shown) mounted in a housing 50 which is carried by a standard 51.

The operation of the apparatus shown in Fig. 1 is substantially as follows: After the machine has been flushed with oxygen, the spirometer 10 is filled with oxygen and the spirometer 11 is completely emptied. The valve 29 is adjusted in the manner illustrated in Fig. 1 to connect the bore 24 with the valve housing 31. The subject then breathes into the mouth-piece or mask (not shown). On inspiration, the one-way valves 28 and 32 cause oxygen to be taken from the spirometer 10 and during expiration they direct the expired air into the spirometer 11. The bell 14 moves down with each inspiration and the bell 20 moves up with each expiration. The movements of the bells 14 and 21 are recorded upon the chart 46 by the stylus 48 and the stylus 47, respectively.

When the recording device 40 is employed, it is not necessary to have the subject breath into the apparatus for a predetermined period of time as the time factor may be taken from the chart. However, if the recording device is not employed, or, if it is so desired, the subject may be connected to the apparatus for a predetermined period of time.

After the subject has been disconnected from the apparatus, readings may be taken either from the chart or from the spirometers of the amount of oxygen withdrawn from the spirometer 10 and the amount of carbon dioxide and oxygen stored in the spirometer 11. The valve 29 is then manipulated to connect the bore 24 with the tube 30 so that the contents of the bell 20 will flow through the bore 24, the valve 29, the tube 30, and thence through the chamber 16 into the spirometer 10. A small weight may be placed upon the bell 20 to aid in forcing the contents of the spirometer 11 into the spirometer 10. Obviously, the contents of the chamber 16 will remove the moisture and carbon-dioxide from the contents of the spirometer 11 as they flow through the chamber 16. After the entire contents of the spirometer 11 have been emptied into the spirometer 10, a reading may be taken on the spirometer 10 to determine the amount of oxygen remaining therein so that the consumption of oxygen by the subject can be determined.

By following the procedure outlined above three readings are obtained or recorded. First, the amount of oxygen withdrawn from the spirometer 10 while the subject was attached thereto; second, the amount of carbon-dioxide and oxygen delivered into the spirometer 11 during the same period; and, third, the amount of oxygen which was returned to the spirometer 10 when the expired air from the spirometer 11 was forced into it through the absorbing chamber 16.

The difference between the first and second of these readings will be the amount of oxygen consumed plus the amount of carbon-dioxide produced; the difference between the second and third of said readings will give the amount of carbon-dioxide produced, and the readings may also be used to determine the amount of oxygen consumed.

As the capacity of the spirometers and the length of time the subject breathed into the machine will be known, the readings of oxygen consumption and carbon-dioxide production can be calculated with little effort. The readings of oxygen consumption and carbon-dioxide production can also be determined from the chart 46. The same corrections of temperatures and atmospheric pressure as are necessary in all work of this character would, of course, be necessary if accuracy is desired.

Referring to Figs. 2 and 3 wherein another form of the invention is illustrated, the reference characters 60, 61 and 62 designate, generally, three spirometers. The spirometer 60 comprises a double walled tank 63 and a bell 64 of conventional construction. The spirometer 61 comprises a tank 65 and a bell 66 of similar construction and the spirometer 62 comprises a tank 67 and a bell 68 of similar construction.

Disposed in the tank 65 is a housing which provides a chamber 71 holding a supply of chemicals for removing moisture from air passing therethrough. Calcium chloride has been found to be suitable. The chamber 71 communicates with the interior of the tank 65 through a port 73 in the housing 70. The chamber 71 is operatively connected to a two-way rotary plug valve 75 through a pipe 76.

A housing 77 in the tank 67 provides a chamber 78 which holds a supply of chemicals for removing moisture and carbon-dioxide from air passing therethrough. A mixture of calcium hydroxide and sodium hydroxide in granular form has been found suitable for this purpose. The air may flow into the chamber 78 through a pipe 80 which is operatively connected to the valve 75. The air may flow from the chamber 78 into the tank 67 through a port 81 provided in the upper end of the housing 77.

The lower end of the tank 63 communicates with a valve chamber 84 which is connected by a pipe 85 to a valve chamber 86. The valve chamber 86 is connected to the valve 75 by a pipe 87. Check valves 89 and 90 of well known construction are provided in the valve chambers 84 and 86, respectively. The valve 89 permits oxygen to flow from the spirometer 60 to the pipe 85 but prevents a flow of fluid in the opposite direction. The valve 90 permits fluid to flow from the pipe 85 to the pipe 87, but prevents a flow of fluid in the opposite direction.

Connected to the pipe 85 by a T-fitting 92 is a pipe section 93 to which one end of a flexible tube 94 is connected. The other end (not shown) of the tube 94 is provided with the usual mouthpiece or mask (not shown) into which the subject may breathe.

The valve 75 comprises a rotary plug member 95 having passages 96 and 97 therethrough.

As best shown in Fig. 3, one end of the rotary member 95 is reduced in diameter and forms a boss 99 on which a ratchet wheel 100 is secured. Rotatably mounted on the outer end of the boss 99 is a lever 102 which carries a pawl 103 adapted to engage the teeth of the ratchet wheel 100, the pawl 103 being spring-pressed into engagement with the teeth. The free end of the lever 102 is connected to a lever 104 by a pin 105 which rides in a slot 106 provided in one end of the lever 104. As hereinafter explained the lever 104 may be rotated to rotate the lever 102 from the position wherein it is shown in full lines in Fig. 3 into the position in which it is shown in dotted lines in the same Figure, the lever 102 being returned to the full line position (Fig. 3) by a helical spring 107 which has one of its ends in engagement with the lever 102, and has the other of its ends secured to the housing of the valve 75, or any other fixed part of the apparatus. When the lever 102 is rotated in a clockwise direction (Fig. 3), the pawl 103 engages the teeth of the ratchet-wheel 100 and rotates the ratchet-wheel and the rotary member 95, but when the lever 102 is rotated in a counter-clockwise direction (Fig. 3) by the spring 107, the pawl 103 rides over the teeth of the ratchet-wheel. A spring-pressed pawl 110 prevents the ratchet-wheel 100 from being rotated in a counter-clockwise direction (Fig. 3).

The construction of the valve 75 and the mechanism for actuating it is such that when the lever 102 is oscillated through the action of the lever 104 and the spring 107, the rotary member 95 will be advanced intermittently in a counter-clockwise direction (Fig. 2) which appears a clockwise direction in Fig. 3. The passages 96 and 97 will connect the pipe 87 to the pipes 76 and 80 alternately for a purpose which will presently appear.

The bells 64, 66 and 68 are connected by cables 112, 113 and 114, respectively, to styli or pins 115, 116 and 117, respectively, these pins forming part of a recording device which is designated, generally, by the reference character 119. The cables are trained over sheaves 120 mounted on suitable brackets.

The recording device 119 may be of any suitable construction, but preferably comprises a drum 122 carrying a chart 123, the drum being rotated by suitable clock mechanism (not shown) enclosed within a housing 124. The pins 115, 116 and 117 are adapted to record the movements of the bells 64, 66 and 68, respectively, upon the chart 123.

The lever 104 is preferably actuated by a solenoid 126 adapted to attract an armature 127 carried by the lever 104. The lever 104 is pivoted intermediate its ends on a bracket 128 which forms part of the frame-work of the improved apparatus.

The solenoid 126 is controlled by means comprising a solenoid 130 and switch devices which are designated generally by the reference characters 131 and 132.

The switch device 131 preferably comprises a lever 134 which is mounted or fixed intermediate its ends on a pin 135. One end of the lever 134 carries an armature 136 for the solenoid 130 and the other end of the lever 134 is provided with a contact point 137 adapted to engage a quantity of mercury 138 held in a receptacle 139. Constrained to rotate with the lever 134 and pivoted upon the pin 135 is a friction disk 140 which engages the cable 112 and is adapted to be rotated thereby so that it will, in turn, rotate the pin 135 and the lever 134 to bring the contact point 137 into engagement with the mercury 138.

The switch device 132 comprises a flexible contact member 150, adapted to be brought into engagement with a contact member 151 by the lever 104 when the lever 104 is rotated in a clockwise direction (Fig. 2) against the action of the spring 107.

Any suitable source of electrical energy may be provided for the solenoids 126 and 130. In this instance batteries 155 and 154 are provided for this purpose.

The mercury 138 is electrically connected to one terminal of the solenoid 126, the other terminal of that solenoid being connected to one terminal of the battery 155 which has its other terminal connected to the switch arm 134. The contact 151 is connected to one terminal of the battery 154 which has its other terminal connected to one terminal of the solenoid 130, the other terminal of the solenoid 130 being connected to the flexible contact member 150.

If it is assumed that the apparatus is in the condition wherein it is illustrated in full lines in Fig. 2, and it is further assumed that a subject is withdrawing oxygen from the spirometer 60 intermittently, it is readily understood that with each inspiration of the subject the bell 64 is lowered. As the bell 64 is lowered the cable 112 is displaced and rotates the disk 140 in a clock-wise direction (Fig. 2) through a small angle to bring the contact point 137 into engagement with the mercury 138. Electrical current will then flow as follows: From the battery 155 through the winding of the solenoid 126, the mercury bath 138 and thence through the contact point 137 and the lever 134 to the battery 155. When the solenoid 126 is energized in this manner, it attracts its armature 127 to rotate the lever 104 in a clockwise direction (Fig. 2) against the action of the spring 107 and rotates the rotary member 95 of the valve 75 90°. When the lever 104 moves into the position wherein it is shown in dotted lines in Fig. 2, it flexes the flexible contact 150 and brings it into engagement with the contact 151 so that an electrical current flows as follows: From the battery 154 through the contact 151, the contact 150 and thence through the solenoid 130 back to the battery 154. When the solenoid is energized in this manner and when the cable stops its downward movement between breaths it attracts its armature 136 and angularly displaces the lever 134 to bring the contact point 137 out of engagement with the mercury bath 138, whereupon the solenoid 126 is de-energized and the spring 107 functions to retract the levers 104 and 102 to the full line position.

Alternate expirations of the subject will be delivered to the spirometer 61 and the remaining expirations will be delivered to the spirometer 62.

The operation of the apparatus shown in Figs. 2 and 3 is substantially as follows: The spirometer 60 is filled with oxygen and the bells 66 and 68 are driven into their lowermost positions; the excess air being allowed to escape through outlet valves (not shown). The subject then breathes into the usual mouth-piece or mask (not shown). The duration of the test may be predetermined, or it may be determined subsequently by the readings or graphs drawn upon the chart 123. During each inspiration the subject withdraws oxygen from the spirometer 60. The air exhaled by the patient can not be returned to the spirometer 60 because of the check valve 89, but is delivered to the pipe 87 through the check valve 90. Then, as explained in detail above, the valve 75 causes alternate expirations of the subject to be delivered to the spirometer 61 and the remaining or intermediate expirations to be delivered to the spirometer 62. The chemicals in the chamber 71 remove the moisture from the expirations which pass into the spirometer 61 and the chemicals in the chamber 78 remove the moisture and carbon-dioxide from the expirations which pass into the spirometer 62.

The movements of the three spirometer bells are recorded on the chart 123 and as the speed of the drum 122 is known, the rate and the total amount of movement of each of the spirometers can be calculated from the slope of the three graphs.

Then if $X =$ the amount of oxygen withdrawn from the spirometer 60, and $Y =$ the amount of oxygen and carbon-dioxide stored in the spirometer 61, from expirations of the subject, and $Z =$ the amount of unconsumed oxygen stored in the spirometer 62 from the expirations of the subject, the following equations may be written:

$X - 2Z =$ the oxygen consumed, and
$2(Y - Z) =$ the carbon dioxide produced.

The metabolism machine shown in Figs. 2 and 3, is somewhat more complicated mechanically than the machine shown in Fig. 1, but it has several advantages not found in the machine shown in Fig. 1. Thus, the metabolism machine shown in Figs. 2 and 3 lends itself more readily to graphic recording so that the volume changes can be calculated as rates of change. This makes it unnecessary to time the patient's connection with the machine. Also, absolute volumes of gas do not have to be measured when the machine shown in Figs. 2 and 3 is employed and, therefore, the errors incurred in such measurements are avoided. Other advantages of the machine shown in Figs. 2 and 3 are, that the relation of carbon-dioxide production to oxygen consumption can be calculated for any period of time during a test and no further operation is necessary after the subject is disconnected from the machine.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new, and desire to secure by Letters Patent, is:

1. A metabolism machine comprising a spirometer for holding a supply of oxygen, means whereby the subject may withdraw oxygen from said spirometer, a second spirometer for receiving the expirations of the subject, recording means associated with said spirometers, means for passing the expired air from said second spirometer to the first-mentioned spirometer, and means associated with said first spirometers for removing carbon dioxide from the expired air.

2. A metabolism machine comprising a spirometer for holding a supply of oxygen, means whereby the subject may withdraw oxygen from said spirometer, a second spirometer for receiving the expirations of the subject, and means for passing the expired air from said second spirometer to the first-mentioned spirometer, the last-mentioned means including means for removing carbon dioxide from the expired air.

3. A metabolism machine comprising a spirometer having a movable bell, means whereby oxygen may be withdrawn from said spirometer by the oxygen subject, a second spirometer having a movable bell, means whereby expirations of the subject are stored in said second spirometer, means associated with one of said spirometers for removing carbon dioxide from the expired air, and means for recording the movements of said bells.

4. A metabolism machine comprising a spirometer for holding a supply of oxygen, means including a check valve whereby oxygen is withdrawn from said spirometer by the subject, a second spirometer, means including a check valve whereby expirations of said subject are stored in said second spirometer, valve-controlled means for passing the expired air stored in said second spirometer into the first-mentioned spirometer, means for removing the carbon dioxide from said expired air as it passes into the first mentioned spirometer, and recording means associated with said spirometer.

5. A metabolism machine comprising a spirometer having a movable bell and adapted to hold a supply of oxygen, valve-controlled means whereby the subject may withdraw oxygen from said spirometer, a second spirometer having a movable bell, valve-controlled means whereby expirations of said subject are stored in said second spirometer, valve-controlled means for passing the expired air from said second spirometer to the first-mentioned spirometer, means for removing carbon dioxide from the expired air as it passes into the first-mentioned spirometer, and means for recording the movements of said bells.

6. A metabolism machine comprising a spirometer for holding a supply of oxygen, means whereby the subject may withdraw oxygen from said spirometer, a second spirometer, a third spirometer, means through which expirations of said subject pass into said second and third spirometers in substantially predetermined proportionate amounts, and means for removing carbon dioxide from the expirations of said subject as they pass into said third spirometer.

7. A metabolism machine comprising a spirometer adapted to hold a supply of oxygen and provided with a movable bell, a second spirometer having a movable bell, a third spirometer having a movable bell, means whereby the subject may withdraw oxygen from the first mentioned spirometer, means through which expirations of said subject pass to said second and said third spirometers in substantially fixed proportionate amounts, means for removing carbon dioxide from the expirations of said subject as they pass into said third spirometer, and means for recording the movements of said bells.

8. A metabolism machine comprising a spirometer for holding a supply of oxygen, means whereby the subject may withdraw oxygen from said spirometer, a second spirometer, a third spirometer, means through which expirations of said subject pass into said second and said third spirometers in substantially fixed proportionate amounts, means in said second spirometer for removing moisture from the expirations of said subject as they pass into said second spirometer and measuring means associated with said spirometers, and means for removing carbon dioxide from the expirations of said subject as they pass into said third spirometer.

9. A metabolism machine comprising a spirometer for holding a supply of oxygen, a second spirometer, a third spirometer, means whereby oxygen may be withdrawn from the first spirometer by the subject, means for alternately passing the expirations of said subject to said second and said third spirometers and recording means associated with said spirometers, and means for removing carbon dioxide from the expirations passing into said third spirometer.

10. A metabolism machine comprising a spirometer for holding a supply of oxygen, a second spirometer, a third spirometer, means whereby the subject may withdraw oxygen from the first spirometer, means through which expirations of said subject pass to said second and said third spirometers in substantially equal amounts, means for removing moisture from the expirations passing into said second spirometer, means for removing carbon dioxide and moisture from the expirations passing into said third spirometer, and recording means associated with said spirometers.

11. A metabolism machine comprising a spirometer for holding a supply of oxygen, a second spirometer, a third spirometer, means whereby the subject may withdraw oxygen from the first spirometer, means for passing the expirations of said subject into said second and said third spirometers in substantially equal amounts, means for removing carbon dioxide from the expirations passing into said third spirometer, and recording means associated with said spirometers.

12. A metabolism machine comprising means including a plurality of interconnected spirometers, one of said spirometers being adapted to furnish a supply of oxygen, a device associated with another of said spirometers for removing carbon dioxide from the expired air, and a recording device associated therewith for measuring the oxygen inspired by the subject and the air expired by the subject before and after carbon dioxide has been removed from it.

SAMUEL SOSKIN.